United States Patent [19]

Dantlgraber

[11] Patent Number: 4,540,018

[45] Date of Patent: Sep. 10, 1985

[54] PRESSURE CONTROL VALVE

[75] Inventor: Jörg Dantlgraber, Lohr-Sackenbach, Fed. Rep. of Germany

[73] Assignee: Mannesmann Rexroth GmbH, Lohr, Fed. Rep. of Germany

[21] Appl. No.: 409,659

[22] Filed: Aug. 19, 1982

[30] Foreign Application Priority Data

Aug. 28, 1981 [DE] Fed. Rep. of Germany ....... 3134065

[51] Int. Cl.³ .............................................. F16K 17/06
[52] U.S. Cl. ................................... 137/540; 137/529; 137/625.65
[58] Field of Search .................. 91/363, 361, 386, 387, 91/361, 363 R; 137/529, 540, 625.65, 102, 535, 537, 538, 528, DIG. 7; 251/137

[56] References Cited

U.S. PATENT DOCUMENTS

| 1,308,165 | 7/1919 | Clark | 137/529 |
|---|---|---|---|
| 1,518,894 | 12/1924 | Bliss | 251/137 |
| 1,777,611 | 10/1930 | Grohek | 137/528 |
| 2,179,003 | 11/1939 | Allen | 137/528 X |
| 2,436,992 | 3/1948 | Ernst | 137/625.65 |
| 2,944,564 | 7/1960 | Pettey, Jr. | 137/529 |
| 3,017,897 | 1/1962 | Sequenot | 137/DIG. 7 X |
| 3,714,953 | 2/1973 | Solvang | 137/528 X |
| 3,774,641 | 11/1973 | Mimdner et al. | 137/625.64 |
| 4,106,522 | 8/1978 | Manesse | 137/540 |
| 4,133,511 | 1/1979 | Hartmann et al. | 137/625.64 |
| 4,253,480 | 3/1981 | Kessel et al. | 137/102 |
| 4,312,380 | 1/1982 | Leiber et al. | 137/625.65 |

FOREIGN PATENT DOCUMENTS

| 2103366 | 8/1972 | Fed. Rep. of Germany | 137/528 |
|---|---|---|---|
| 1496256 | 9/1977 | United Kingdom | 137/529 |

Primary Examiner—Martin P. Schwadron
Assistant Examiner—John S. Starsick, Jr.
Attorney, Agent, or Firm—Roberts, Spiecens & Cohen

[57] ABSTRACT

The pressure response of a pressure control valve is adjusted by a solenoid valve of which the solenoid is connected to an electrical three point control device. A programmed signal and an actual signal derived from a transformer of the control pressure valve are fed to the input of the three point control device.

8 Claims, 1 Drawing Figure

U.S. Patent  Sep. 10, 1985  4,540,018
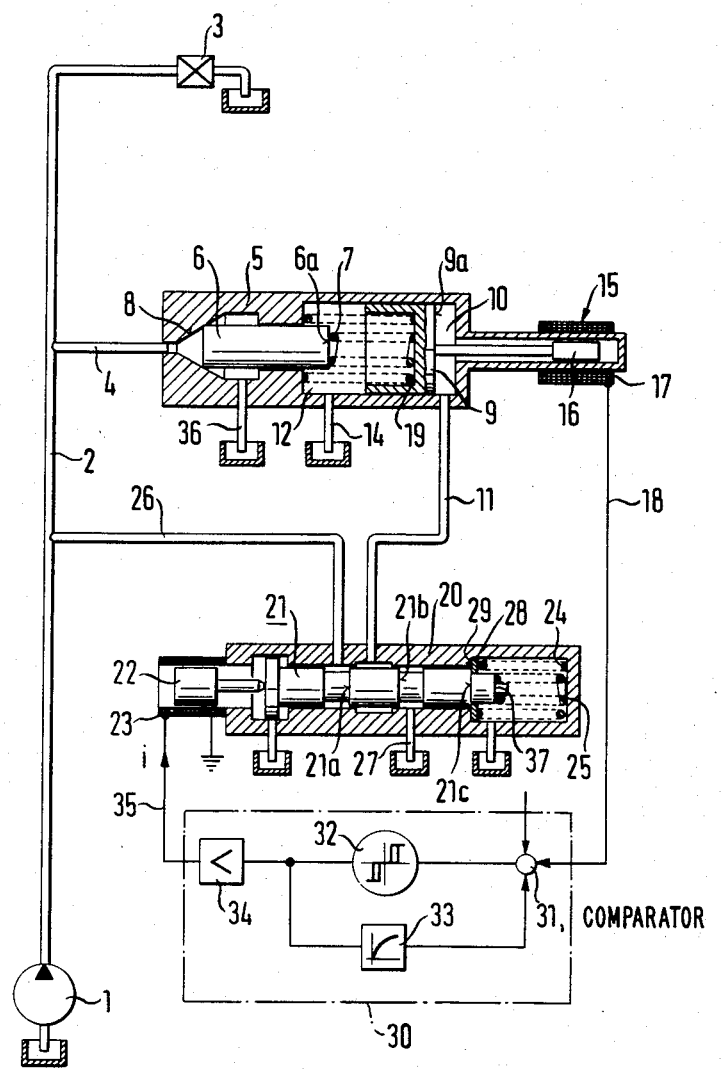

4,540,018

PRESSURE CONTROL VALVE

FIELD OF THE INVENTION

The present invention relates to a control device for controlling the pressure in a pressure line supplying fluid to a load, comprising a pressure control valve which removes pressurized fluid from said pressure line when a predetermined pressure in the pressure line is reached, and a pilot valve to control the closure member of said pressure control valve.

PRIOR ART

Pressure control valves are usually controlled by electromagnetic means, for example by a proportional magnet, a moving coil or torque motors. Generally, the armature of a proportional magnet acts on the closure member of the valve against the force of a spring engaging said closure member. The position of the armature of the proportional magnet is determined by a pick-up means whose output signal is fed to a control device including an amplifier to control an input signal to the coil of the magnet. In a similar manner the opening pressure of the valve is controlled.

In the prior art, the proportional magnet must back up the full pressure of the pressure line which pressure acts on the closure member and, the magnet additionally, must have a length of stroke which is determined by the spring which is necessary to bias the closure member. To keep the magnetic means within reasonable limits, the dimension of the valve seat must not exceed rather small values. Consequently a pressure control valve of this type can be designed only for small flow capacity.

For a larger flow such type of valve having magnetic means may be used as a pilot valve to control a pressure control valve. These valve devices are expensive.

SUMMARY OF THE INVENTION

Accordingly it is an object of the present invention to provide a valve means to control the pressure in a line which has a simplified structure.

This and other objects and features of the invention are set forth in the detailed description of a preferred embodiment to follow.

According to the teaching of the invention, the improvement comprises a solenoid valve as, pilot valve which solenoid valve has three definite positions in one of which a control chamber of the pressure control valve is cut off, in a second of which pressure is supplied to said control chamber and in a third of which pressure is released from said control chamber, the solenoid of said solenoid valve being controlled by an electrical three point switch.

According to the invention, the pilot valve is greatly simplified as a plain shift valve which is electrically controlled by a three point control device and replaces the magnetic means having a proportional characteristic. The three point control device merely delivers three shift signals causing the adjusting piston of the pressure control valve either to stop or to be moved in the direction of opening or closing. This motion of the adjusting piston is picked up by a simple transformer connected to the adjusting piston which transformer produces a control signal which represents the actual signal to be fed to a comparator to whose second input a programmed signal is applied.

The valve means according to the invention has the advantage of controlling high volumes of fluid. Furthermore, the control operation has a high stability and avoids the disadvantage that the control pressure medium must be branched off the main pressure line. Rather, a pressure source having low pressure is sufficient to control the control pressure valve. Furthermore, a minimum flow of control pressure medium is necessary when the programmed signal is maintained constant.

BRIEF DESCRIPTION OF THE DRAWING

The specific embodiment of the invention which is described in detail below is set forth by way of example only and should not be construed as to limit the scope of the invention which is defined in the appended claims. In the attached drawings, the single FIGURE shows a schematic drawing of the control device according to the invention.

DETAILED DESCRIPTION

A pump 1 delivers fluid through a pressure line 2 to a load 3. A pressure control valve 5 is connected to the pressure line 2 via a branch line 4. A closure member 6 is urged towards a valve seat 8 by a spring 7. When a pressure is reached in the pressure line 2 which pressure corresponds to the bias force of spring 7 the closure member 6 will open and pressure fluid passes the closure member 6 and flow through the line 36 into the reservoir. When the pressure decreases, the closure member 6 closes. Accordingly, the opening pressure of the pressure control valve is determined by the bias force of the spring 7.

The bias force of spring 7 is defined by the position of a piston 9. The face area 9a of the piston 9 has a larger cross section than the face area 6a of the closure member. A control pressure prevailing in line 11 and control chamber 10 is applied to the face area 9a of the piston 9. The space 12 between the positioning piston 9 and the closure member 6 is vented to reservoir through a line 14.

The position of the piston 9 is picked up by a transformer 15 including a magnetic core 16 and a coil 17. The drawing shows an induction-type transformer. However, the transformer could be of the capacitive type or it could be a potentiometer. An electrical actual signal (control signal) corresponding to the position of the piston 9 appears in the output line 18.

A solenoid valve as a pilot valve 20 is further provided. A spool member 21 of the pilot valve is engaged by an armature 22 which is displacably arranged in the coil 23 in one direction, whereas the spool member is urged by a pair of springs 24 and 25 in the opposite direction. Furthermore, the spool member 21 includes a spool land 21a and a spool land 21b. The pressure in the line 2 is applied to the pilot valve 20 through a branch line 26.

The drawing shows the spool member 21 in its center position in which the spool land 21a cuts off the flow of fluid from branch line 26 into the line 11 and thereby into the control chamber 10 of the pressure control valve 5. Further the control land 21b of the spool member 21 cuts off the connection between line 11 and a line 27 to reservoir. In this position, the control chamber 10 is cut off and the piston 9 is maintained in its present position.

An electrical control means 30 for the pilot valve 20 comprises a comparator 31, a three point switch 32, a feed back circuit 33 and an amplifier 34. The feed back circuit may include an adjustable voltage divider to change the gain factor.

The actual control signal which is generated in the transformer 15 and appears in line 18 and a programmed signal which is manually adjusted are compared in the comparator 31. The difference of both signals is fed to the three point switch 32 which can produce three output signals, namely: a zero output when the programmed signal equals the actual signal, as well as a positive or negative output when the comparator 31 determines a positive or, respectively negative difference between the programmed signal and the actual signal.

Depending on the output of the three point switch 32 the amplifier 34 produces three current values to define actuating signals which are fed via the line 35 to the coil 23 of the solenoid valve. The current signals which are generated by the amplifier 34 are zero, 50% and 100% valves.

Correspondingly the armature 22 is urged against the spool member 21 of the pilot valve with a zero force, a 50% force or 100% force. This results in motions of the spool member as follows:

In the position shown, the spool member is moved into the center position by the solenoid 22 when the current signal amounts to 50% In this center position of the spool member 21 the control land 21c is urged towards a washer 21 which is biased by the spring 24 to contact a shoulder 29 of the valve housing. In this position, the line 11 is cut off and the piston 9 of the pressure control valve 5 is maintained in the position shown.

However, when the output of the amplifier 34 is zero, the spring 25 acting on the projection 26 of the spool member 21 moves the latter to the left until the control land 21b connects the line 11 to the reservoir line 27 which results in a pressure decrease in the control chamber 10 to decrease the bias force of the spring 7 so that the closure member 6 of the pressure control valve 5 may be opened.

A current signal of 100% fed from the amplifier 34 to the solenoid 22 causes the spool member 21 to displace to the right in opposition to the force of both springs 24 and 25 until the control land 21a makes a connection between the control pressure line 26 and the line 11 to the control chamber 10. The piston 9 is thus moved to the left to increase the bias force of the spring 7 so that the closure member 6 is pressed with greater force against the valve seat.

Obviously the actuation of the pressure control valve 5 by means of the pilot valve 20 is substantially simplified. The positive, negative or zero output signal of the three point switch 32 is converted into the current signals zero 50% and 100% in the amplifier 34. A predetermined position of the pilot valve 20 corresponds to these current values. The three point switch is further connected to the feed-back circuit 33 which comprises a delay circuit whose gain factor may be adjusted.

As the cross section of the piston 9 of the pressure control valve 5 is substantially larger than the face of the closure member 6 to which the pressure is applied, the control pressure must not be taken from the pressure line 2, but may be branched off from any other pressure source having a lower pressure.

A spring 19 located between the closure member 6 and the piston 9 in addition to spring 7 improves the stability of the valve.

Instead of the pressure control valve shown and described, the pilot valve controlled by the three point control device may actuate other types of valve as well, for example, flow path valves or control position valves for pumps.

What is claimed is:

1. In a control device for controlling the pressure in a pressure line connected to a load, comprising a pressure control valve receiving pressurized fluid from said pressure line when a predetermined pressure in the pressure line is reached, said pressure control valve including a closure member, and a pilot valve to adjust the closure member of said pressure control valve, the improvement wherein said pilot valve comprises a solenoid valve having three defined positions, said pressure control valve further comprising a control chamber for pressure fluid for biasing the closure member, a piston to which the pressure in said control chamber is applied, and which in turn applies the pressure in the control chamber to said closure member, said control chamber of the pressure control valve in one of said positions of the solenoid valve being isolated, in a second of said positions being supplied with pressure fluid and in a third position being released of pressure fluid, said solenoid valve including a solenoid which determines said three positions of said solenoid valve and an electrical three point switch means for controlling said solenoid to set the position of the solenoid valve selectively to one of said three positions, sensing means connected to said pressure control valve for producing an output signal related to the pressure in the pressure chamber, and comparator means receiving the output signal from the sensing means for comparing said output signal with a predetermined signal to produce a control signal, said comparator means being connected to said three point switch means for supplying said control signal thereto to operate said three point switch means to produce an output signal therefrom to set the position of the solenoid valve selectively to one of said three positions.

2. A control device as claimed in claim 1 wherein said sensing means comprises a transformer.

3. A control device as claimed in claim 1 comprising a feed-back circuit connected to said comparator means for feeding back said control signal to the comparator means, said feed-back circuit including delay means.

4. A control device as claimed in claim 3 wherein said delay means has an adjustable gain.

5. A control device as claimed in claim 1 wherein said solenoid includes a coil, said control device further comprising an operational amplifier connected between said three point switch means and said coil of the solenoid.

6. A control device as claimed in claim 1 wherein said solenoid valve includes a displaceable spool member, an armature urging said spool member in one direction of travel, and first and second springs urging the spool member in the opposite direction of travel, said first spring moving said spool member into said third position in which said control chamber of said pressure control valve is depressurized by being connected to reservoir when the solenoid receives no current signal, said spool member being moved to contact said second spring in said first position in which the control chamber is isolated when a predetermined first current signal is applied to said solenoid, said spool member being moved against the action of both springs into said second position in which pressure fluid is supplied to said control chamber when a predetermined second current signal is fed to said solenoid.

7. A control device as claimed in claim 6 wherein said pressure control valve includes a further spring interposed between said piston and said closure member, said piston acting on said closure member through said further spring, the bias of said further spring defining the opening pressure of said pressure control valve.

8. A control device as claimed in claim 7 wherein said piston has a cross-section which is larger than the cross-section of said closure member.

* * * * *